United States Patent
Yang et al.

(10) Patent No.: US 8,903,460 B2
(45) Date of Patent: Dec. 2, 2014

(54) METHOD AND SYSTEM OF BLUETOOTH COMMUNICATION

(71) Applicant: Quanta Computer Inc., Kuei Shan Hsiang, Tao Yuan Shien (TW)

(72) Inventors: Rong-Chin Yang, Tao Yuan Shien (TW); Yu-Min Wu, Tao Yuan Shien (TW); Yung-Ming Chung, Tao Yuan Shien (TW); Chih-Hsiung Yu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 124 days.

(21) Appl. No.: 13/867,611

(22) Filed: Apr. 22, 2013

(65) Prior Publication Data

US 2014/0004798 A1    Jan. 2, 2014

(30) Foreign Application Priority Data

Jun. 28, 2012   (TW) .............................. 101123182 A

(51) Int. Cl.
*H04M 1/00*        (2006.01)
*H04W 4/00*        (2009.01)

(52) U.S. Cl.
CPC .................................. *H04W 4/008* (2013.01)
USPC .... 455/574; 455/41.2; 455/127.5; 455/343.1; 370/318

(58) Field of Classification Search
USPC ............... 455/574, 41.2, 127.5, 343.1, 343.5; 370/318, 311, 328
See application file for complete search history.

(56) References Cited

U.S. PATENT DOCUMENTS

| | | | |
|---|---|---|---|
| 6,349,195 B1* | 2/2002 | Saunders | 455/12.1 |
| 6,510,210 B1* | 1/2003 | Baughan | 379/90.01 |
| 6,968,219 B2* | 11/2005 | Pattabiraman et al. | 455/574 |
| 7,102,506 B2* | 9/2006 | Szulanski | 340/539.11 |
| 7,251,508 B2* | 7/2007 | Pattabiraman et al. | 455/574 |
| 7,403,744 B2* | 7/2008 | Bridgelall | 455/41.2 |
| 7,630,323 B2* | 12/2009 | Bridgelall | 370/254 |
| 7,672,263 B2* | 3/2010 | Sinivaara | 370/318 |
| 8,032,084 B2* | 10/2011 | Demirbasa et al. | 455/41.2 |
| 8,224,248 B2* | 7/2012 | Demirbasa et al. | 455/41.2 |
| 8,515,484 B1* | 8/2013 | Meyers | 455/550.1 |
| 2002/0146980 A1* | 10/2002 | Solondz et al. | 455/21 |
| 2006/0240806 A1* | 10/2006 | Demirbasa et al. | 455/412.1 |
| 2007/0036096 A1* | 2/2007 | Sinivaara | 370/318 |
| 2009/0070828 A1* | 3/2009 | Stomakhin et al. | 725/68 |

* cited by examiner

*Primary Examiner* — Minh D Dao

(74) *Attorney, Agent, or Firm* — McClure, Qualey & Rodack, LLP

(57) ABSTRACT

A Bluetooth communication system includes a remote device, having a first Bluetooth module, and a user device, having a second Bluetooth module, and communicating with the remote device through the first Bluetooth module and the second Bluetooth module in a link state. When the remote device and the user device are over a communication range, the remote device enters an access state. In the access state, the first Bluetooth module re-communicates with the second Bluetooth module by a link back mode in a first time interval and a standby mode in a second time interval and when the remote device comes back with the communication range, the communication with the user device is recovered.

10 Claims, 5 Drawing Sheets

METHOD AND SYSTEM OF BLUETOOTH COMMUNICATION

CROSS REFERENCE TO RELATED APPLICATIONS

This Application claims priority of Taiwan Patent Application No. 101123182, filed on Jun. 28, 2012, the entirety of which is incorporated by reference herein.

BACKGROUND OF THE INVENTION

1. Field of the Invention

The disclosure is related to Bluetooth transmission, and, more particularly, to combining the link back mode with the standby mode for re-communicating the remote electrical device.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Remote telemedicine, which uses computer, communication, and cloud technologies, provides personal home health care and teaching training. Remote telemedicine has changed because of advanced technology. With popularization of smart phones, how to transmit physiology information to a remote server via the internet is an important subject for the development of the home health care field. The device which measures a personal physiology signal can transmit data to a remote server for analyzing and storing the data by zigbee, Bluetooth and other communication technologies.

Compared with other wireless communication technologies, the most convenient is Bluetooth, since notebooks and smart phones have Bluetooth technology built-in. However, the current Bluetooth communication technology needs a high amount of electric current when being accessed. Therefore, how to reduce the electric current consumption of Bluetooth communication technology is an important subject.

BRIEF SUMMARY OF THE INVENTION

An embodiment of the invention provides a Bluetooth communication system, comprising: a remote device, having a first Bluetooth module; and a user device, having a second Bluetooth module, and communicating with the remote device through the first Bluetooth module and the second Bluetooth module in a link state. When the remote device and the user device are over a communication range, the remote device enters an access state and in the access state, the first Bluetooth module re-communicates with the second Bluetooth module by a link back mode in a first time interval and a standby mode in a second time interval. When the remote device comes back within the communication range, the communication with the user device is recovered. The remote device is not searched for by another electrical device other than the user device in the standby mode An embodiment of the invention provides a Bluetooth communication method, comprising completing a Bluetooth communication between a user device and a remote device in a link state. When the remote device and the user device are over a communication range, the remote device enters an access state, and in the access state the remote device re-communicates with the user device by a link back mode in a first time interval and a standby mode in a second time interval. When the remote device comes back within the communication range, the communication with the user device is recovered. The remote device is not searched for by another electrical device other than the user device in the standby mode

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
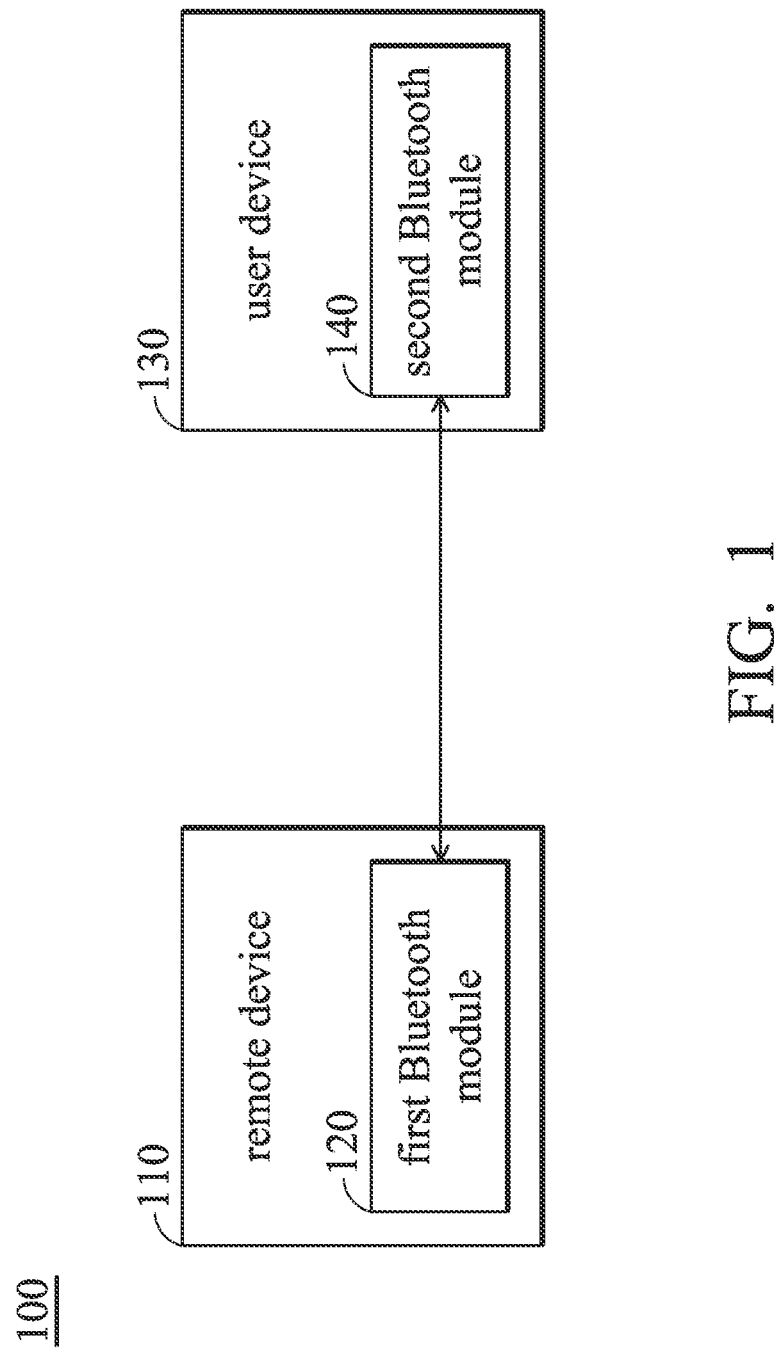
FIG. 1 is a schematic diagram illustrating the Bluetooth communication system 100 according to an embodiment of the invention.

FIG. 1 is a schematic diagram illustrating the Bluetooth communication system 100 according to an embodiment of the invention. In FIG. 1, the Bluetooth communication system 100 comprises a remote device 110 which has a first Bluetooth module 120, and a user device 130 which has a second Bluetooth module 140. In an embodiment of the invention, the remote device 110 is an electrical device which may measure physiology signals such as electrocardiography, and the user device 130 is a smart phone, tablet PC, laptop or other portable electrical device. However, the size of the remote device 110 is usually not large so that the user can use the remote device 110 to measure physiology signals conveniently. Therefore, the battery capacity is also not big. The invention will overcome the problem.

Note, the definitions of the remote device 110 and the user device 130 in the above description are not to limit the invention, and the definitions of the remote device 110 and the user device 130 may be exchanged. That is, the user device 130 also may be an electrical device which may measure physiology signals such as electrocardiography, and the remote device 110 also may be a smart phone, tablet PC, laptop or other portable electrical device.

The operation of the Bluetooth module may be divided into three states, access state, link state and shutdown state. When the Bluetooth module is initiated, the Bluetooth module will be in the access state first, and search the communications of other Bluetooth modules. The access state could be divided into standby mode and link back mode. When the Bluetooth module is the link state, the remote device 110 and the user device 130 may transmit data in one-way or two-ways by the first Bluetooth module 120 and the second Bluetooth module 140. When the Bluetooth module is closed, the Bluetooth module enters the shutdown state, and the electric current consumption may be regarded as zero at the state. Specifically speaking, if the remote device 110 is not matched with any other Bluetooth module, when the first Bluetooth 120 of the remote device 110 is initiated, the first Bluetooth module will enter the standby mode of the access state, and at this mode, the first Bluetooth 120 will be able to be searched and matched by other Bluetooth module. If the second Bluetooth module 140 of the user device 130 is initiated in a communication range such as 3 meters, the second Bluetooth module 140 will search the first Bluetooth module 120, and the user device 130 may complete the match with the remote device 100 by a manual method, for example, inputting the same password, and then entering the link state for transmitting data. Then, if any device such as the user device 130 leaves the communication range, the communication will be interrupted and the Bluetooth module will switch from the link state to the link back mode of access state. When both devices return within the communication range, the remote device 110 which has matched with the user device 130 before will enter the link state automatically for transmitting data without manual re-communication.

Note, aside from the description above, the differences of the standby mode and the link back mode also comprise that the average electric current consumption of the link back mode is higher, but the advantage of the link back mode is that the link back mode may communicate automatically with the user device. Although the average electric current consumption of the standby mode is lower, the deficiency of the standby mode is that the standby mode needs to communicate manually with the user device, and when it is searched by other devices, it needs to consume extra electric current in the process of signal handshaking.

Figure 2A:
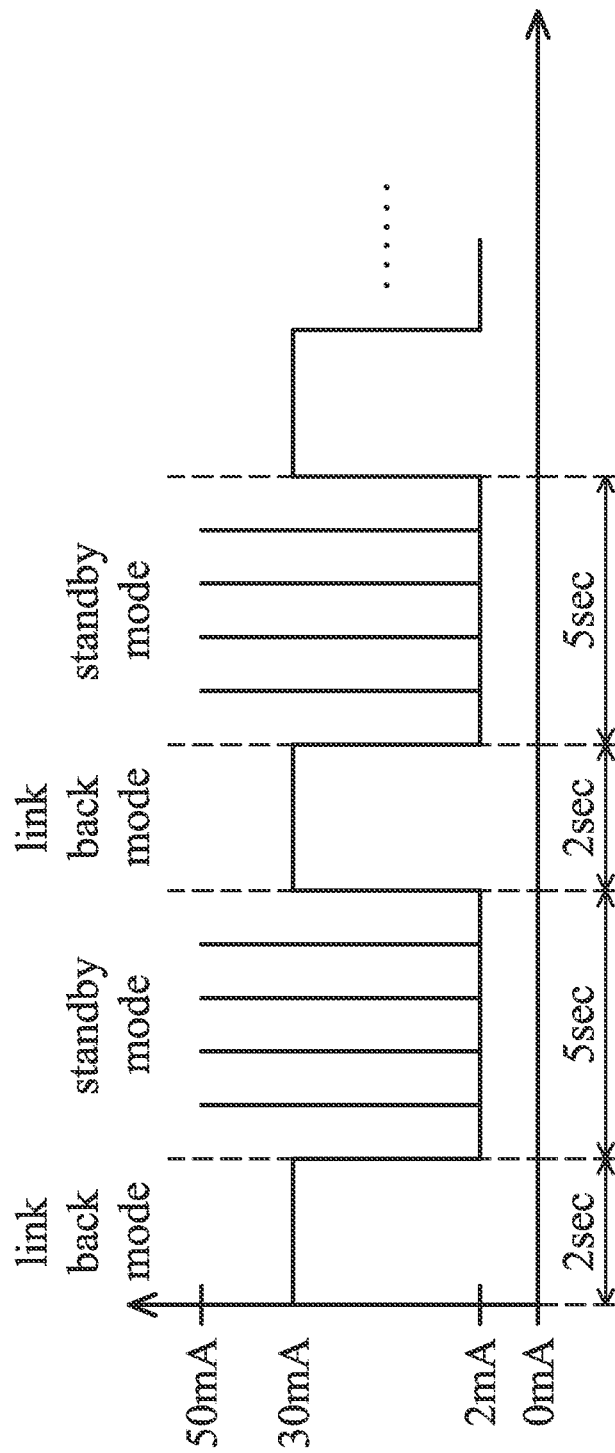
FIG. 2A is a schematic diagram illustrating the re-communication with the user device 130 in the access state according to an embodiment of the invention.

FIG. 2A is a schematic diagram illustrating the re-communication with the user device 130 in the access state according to an embodiment of the invention. In an embodiment of the invention, when the remote device 110 (such as the electrical device for measuring physiology signals) leaves a communication range (for example, the user takes the remote device 110 to a wash room and puts the user device 130 on the table of a living room), the remote device 110 which has matched with the user device 130 enters an access state, and searches to try to re-communicate with the user device 130 continually. Specifically speaking, at first, the first Bluetooth module 120 try to re-communicates with the second Bluetooth module 140 by a link back mode in a first time interval, and if the communication with the user device 130 has still not been recovered in the first time interval, the first Bluetooth module 120 switches to the standby mode in a second time interval to reduce the electric current consumption. When the second interval ends, the first Bluetooth module 120 keep trying to re-communicates with the second Bluetooth module 140 again by a link back mode like in a first time interval and a standby mode like in a second time interval until the remote device 110 comes back within the communication range with the user device 130 and recovers the communication with the user device 130 (for example, the user walks from the washroom to the living room). Meanwhile, if the remote device 110 comes back within the communication range in the first time interval of link back mode, the first Bluetooth module 120 enters the link state automatically for transmitting physiology signals extracted by the remote device 110 to the user device 130 rapidly, and if the remote device 110 comes back within the communication range in the second time interval of standby mode, the remote device 110 will not execute any action until the remote device 110 is switched to the link back mode and execute re-communication.

Specifically speaking, the link back mode described in this embodiment means the method of re-communicating the remote device 110 automatically, and the standby mode described in this embodiment is different from the traditional standby mode. In the traditional standby mode, the remote device 110 may be searched by any other electrical device. However, in the standby mode of the embodiment, the remote device 110 is searchable only by the user device 130, thus reducing extra electric current while being searched by other electrical devices during processing signal handovers. In addition, the standby mode described in this embodiment also provide better privacy for preventing physiology signals from being extracted by other electrical devices.

Generally speaking, when the first Bluetooth module 120 is searched by other electrical devices, the first Bluetooth module 120 will be requested to transmit an acknowledgement (ACK) message. In an embodiment of the invention, the first Bluetooth module 120 is set to reject transmitting of the acknowledgement (ACK) message when the first Bluetooth module 120 detects that the request was not transmitted by the user device 130 (for example, the identity code detected is not of the user device 130) to prevent the remote device 110 from not being searched for by other electrical devices. Thus, other electrical devices cannot communicate with the first Bluetooth module 120. As a result, other electrical devices could not search for the first Bluetooth module 120.

In an embodiment of the invention, in FIG. 2A, the first time interval is set at 2 seconds and the second time interval is set at 5 seconds. However, specifically speaking, the timings for the first time interval and the second time interval are not limited in the invention. Those who are skilled in this technology can set other values of the first time interval and the second time interval.

Figure 2B:
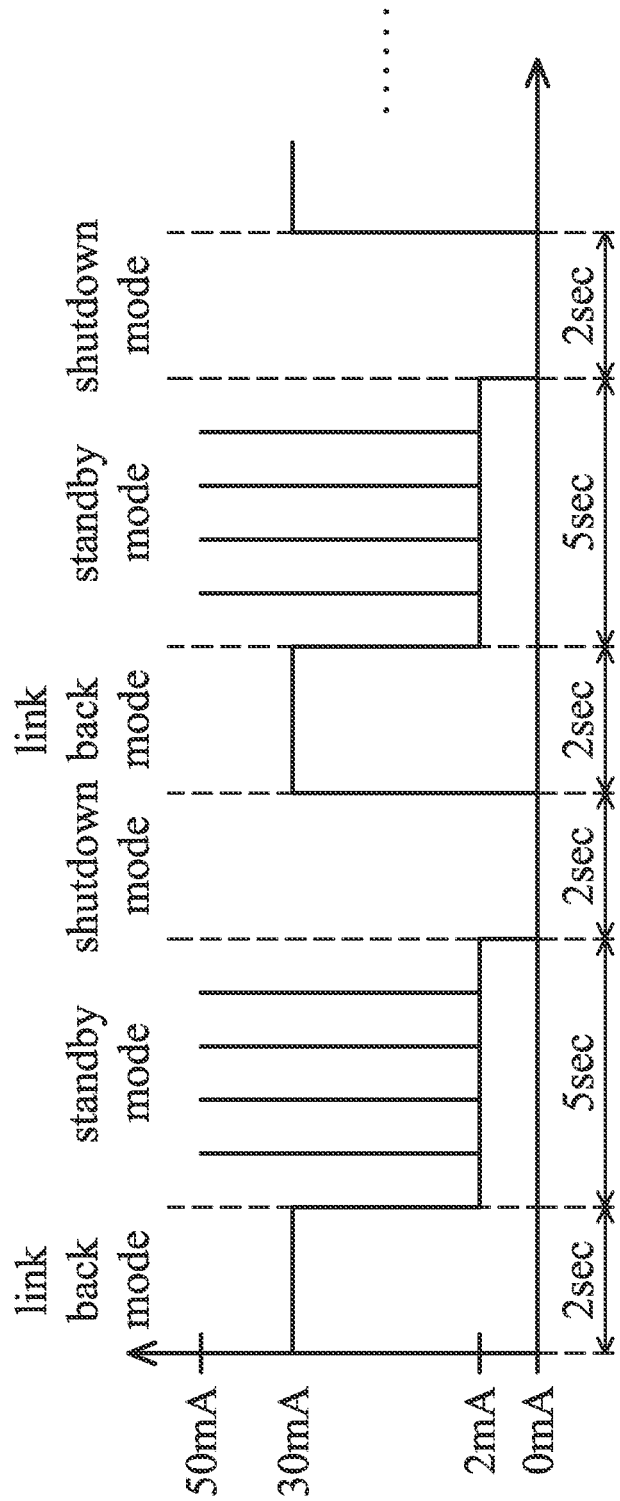
FIG. 2B is a schematic diagram illustrating the re-communication with the user device 130 in the access state according to another embodiment of the invention.

FIG. 2B is a schematic diagram illustrating the re-communication with the user device 130 in the access state according to another embodiment of the invention. In another embodiment of the invention, in FIG. 2B, when the remote device 110 leaves a communication range, the remote device 100 which has been matched with the user device 130 will enter access state and try to re-communicate the user device 130 continuously. Specifically speaking, at first, the first Bluetooth module 120 try to re-communicates with the second Bluetooth module 140 by a link back mode in a first time interval, and if the communication with the user device 130 has not been recovered in the first time interval, the first Bluetooth module 120 switches to the standby mode in a second time interval to reduce the electric current consumption, and then if the communication with the user device 130 has still not been recovered in the second time interval, the first Bluetooth module 120 switches to the shutdown mode (enter shutdown state) and closes the Bluetooth module 120 temporarily in a third time interval to further reduce electric current consumption. In the shutdown mode, electric current consumption is zero. When the third interval ends, if the communication with the user device 130 has still not been recovered, the first Bluetooth module 120 keep trying to re-communicates with the second Bluetooth module 140 again by the link back mode like in the first time interval, the standby mode like in the second time interval and the shutdown mode like in the third time interval until the remote device 110 comes back within the communication range with the user device 130 and recovers the communication with the user device 130. Specifically speaking, the standby mode described in this embodiment is different from the traditional standby mode. In the traditional standby mode, the remote device 110 may be searched for by any other electrical device. However, in the standby mode of the embodiment, the remote device 110 is searchable only by the user device 130, thus reducing extra electric current while being searched by other electrical devices during processing signal handovers. In addition, the standby mode described in this embodiment also provide better privacy for preventing physiology signals from being extracted by other electrical devices.

In an embodiment of the invention, the shutdown mode described in the above embodiment means that the remote device 110 closes the Bluetooth communication function of the Bluetooth module 120. In an embodiment of the invention, in FIG. 2B, the first time interval is set at 2 seconds, the second time interval is set at 5 seconds, and the third time interval is set at 3 seconds. However, specifically speaking, the timings for the first time interval, the second time interval and the third time interval are not limited in the invention. Those who are skilled in this technology can set other values of the first time interval, the second time interval and the third time interval.

Figure 3:
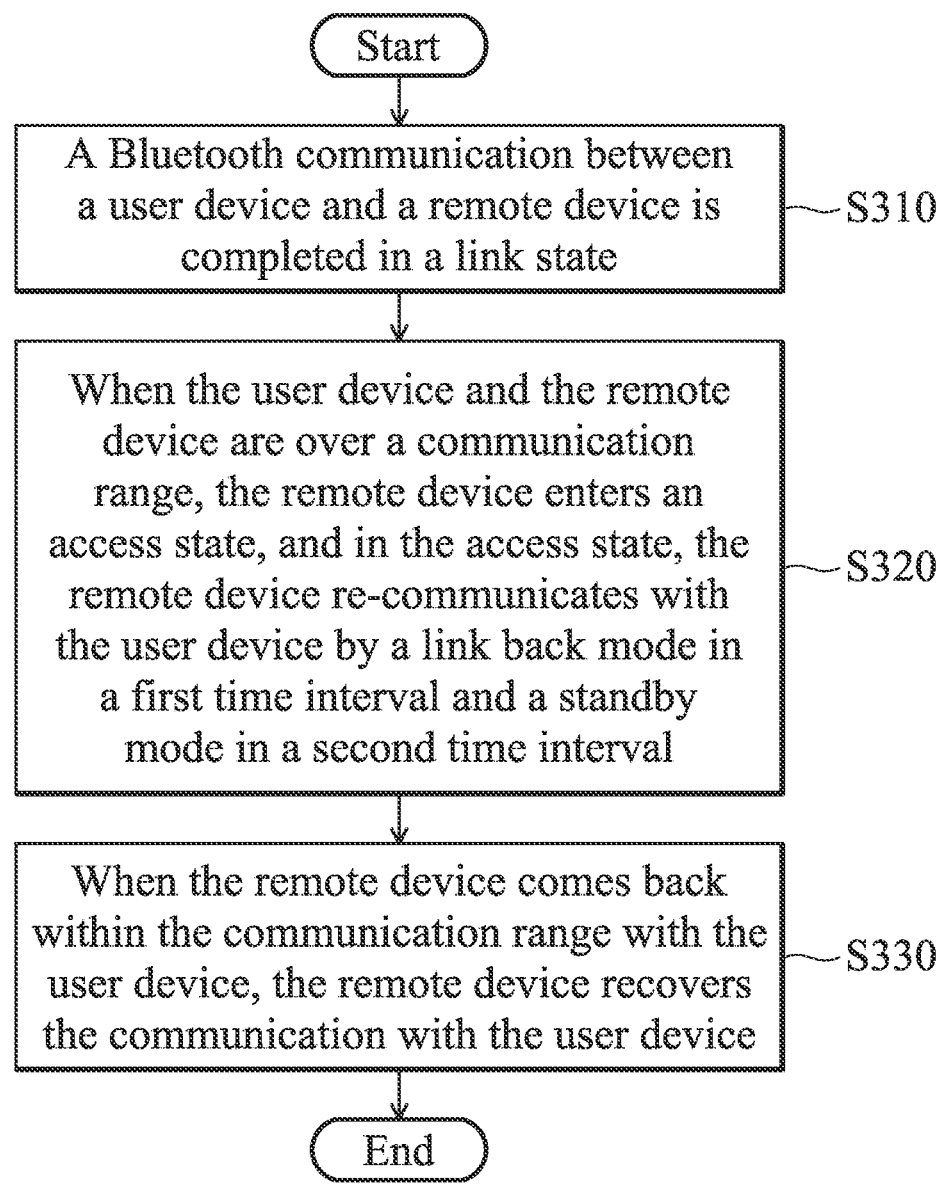
FIG. 3 is a flowchart of a Bluetooth communication method according to an embodiment of the invention

FIG. 3 is a flowchart of a Bluetooth communication method according to an embodiment of the invention. In step S310, a Bluetooth communication between a user device and a remote device is completed in a link state. In step S320, when the user device and the remote device are over a communication range, the remote device enters an access state, and in the access state, the remote device re-communicates with the user device by a link back mode in a first time interval and a standby mode in a second time interval. In step S330, when the remote device comes back within the communication range with the user device, the remote device recovers the communication with the user device. Specifically speaking, the standby mode described in this embodiment is different from the traditional standby mode. In the traditional standby mode, the remote device may be searched for by any other electrical device. However, in the standby mode of the embodiment, the remote device is searchable only by the user device, and therefore, extra electric current is not generated when other electrical devices search for the remote device.

Figure 4:
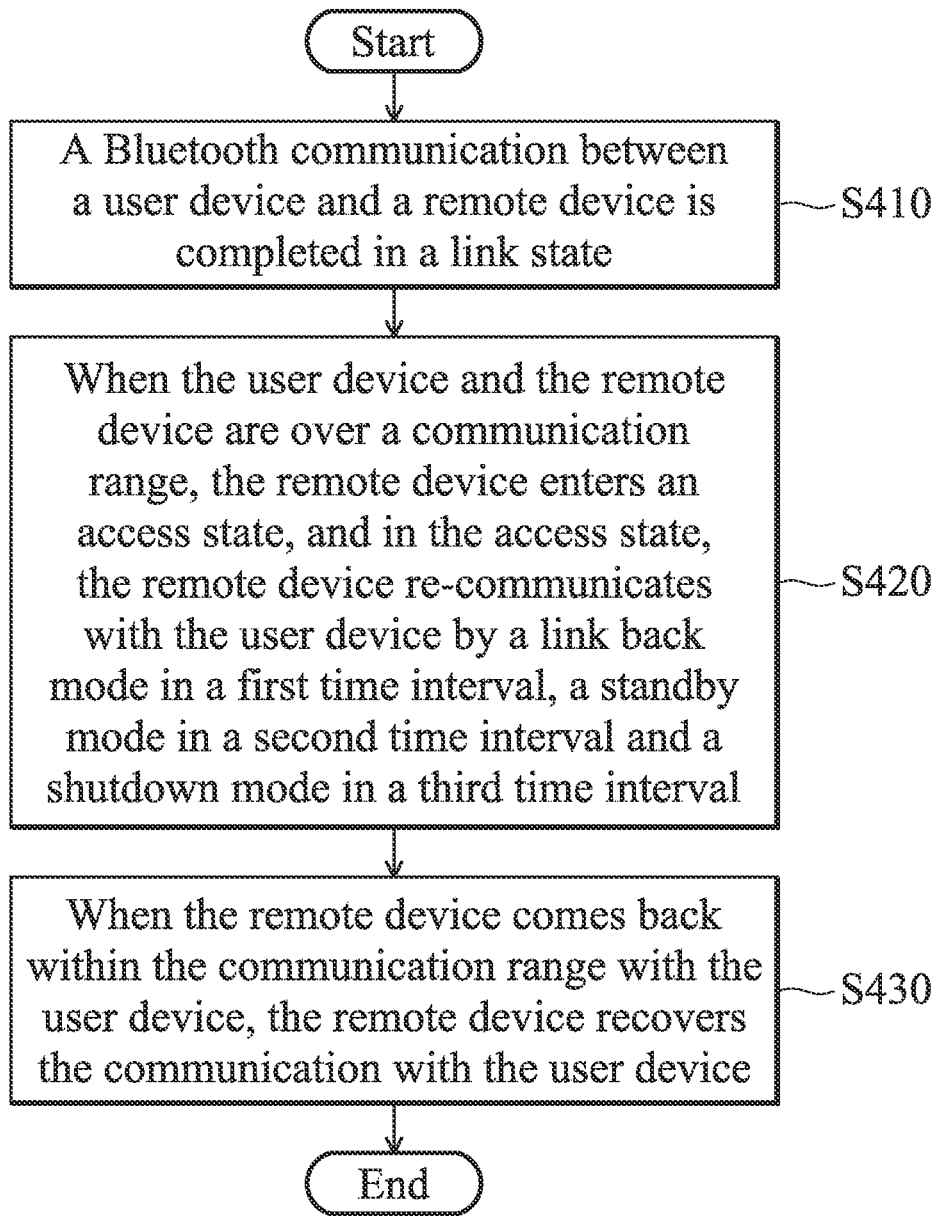
FIG. 4 is a flowchart of a Bluetooth communication method according to another embodiment of the invention.

FIG. 4 is a flowchart of a Bluetooth communication method according to another embodiment of the invention. In step S410, a Bluetooth communication between a user device and a remote device is completed in a link state. In step S420, when the user device and the remote device are over a communication range, the remote device enters an access state, and in the access state, the remote device re-communicates with the user device by a link back mode in a first time interval, a standby mode in a second time interval and a shutdown mode in a third time interval. In step S430, when the remote device comes back within the communication range with the user device, the remote device recovers the communication with the user device. Specifically speaking, the standby mode described in this embodiment is different from the traditional standby mode. In the traditional standby mode, the remote device may be searched for by any other electrical device. However, in the standby mode of the embodiment, the remote device is searchable only by the user device, and therefore, extra electric current is not generated when other electrical devices search the remote device.

Compared with the Bluetooth communication method disclosed in the invention, when the user device and the remote device are over a communication range and enters an access state, the traditional Bluetooth communication method only re-communicates with the user device by a link back mode. In FIG. 2A-2B, if re-communication with the user device only uses the link back mode, the remote device will maintain 30 mA of electric current consumption. However, if re-communication with the user device uses the link back mode combined with the standby mode according to the Bluetooth communication method disclosed in the invention, the remote device will only use an average of 9.5 mA of electric current consumption. As a result, the electric current consumption of the remote device is reduced. In addition, for the traditional Bluetooth communication, when the remote device re-communicates with the user device after a while and doesn't communicate with the user device, the remote device will close the Bluetooth communication function, and when the user come back within the communication range, the user have to restart manually the Bluetooth communication function. However, in the Bluetooth communication method disclosed in the invention, the remote device doesn't need to close the Bluetooth communication function, and when the user comes back within the communication range, the communication with the user device is recovered directly. Therefore, the Bluetooth communication method disclosed in the invention is convenient for the Bluetooth user.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Bluetooth communication system, comprising:
   a remote device, having a first Bluetooth module; and
   a user device, having a second Bluetooth module, and communicating with the remote device through the first Bluetooth module and the second Bluetooth module in a link state,
   wherein when the remote device and the user device are over a communication range, the remote device enters an access state and in the access state, the first Bluetooth module re-communicates with the second Bluetooth module by a link back mode in a first time interval and a standby mode in a second time interval,
   wherein when the remote device comes back within the communication range, the communication with the user device is recovered, and
   wherein the remote device is not searched by another electrical device other than the user device in the standby mode.

2. The system of claim 1, wherein the remote device is an electrical device capable of measuring a physiology signal.

3. The system of claim 1, wherein when the remote device comes back within the communication range, the first Bluetooth module re-communicates with the second Bluetooth module by the link back mode to recover the communication with the user device.

4. The system of claim 1, wherein when the remote device enters the access state, the first Bluetooth module further re-communicates with the second Bluetooth module by a shutdown mode in a third time interval.

5. The system of claim 4, wherein the shutdown mode means that a communication function of the first Bluetooth module is closed.

6. A Bluetooth communication method, comprises:
   completing a Bluetooth communication between a user device and a remote device in a link state;
   when the remote device and the user device are over a communication range, the remote device entering an access state and in the access state, the remote device re-communicates with the user device by a link back mode in a first time interval and a standby mode in a second time interval, and when the remote device comes back with the communication range, recovering the communication with the user device, wherein the remote device is not searched for by another electrical device other than the user device in the standby mode.

7. The method of claim 6, wherein the remote device is an electrical device capable of measuring a physiology signal.

8. The method of claim 6, wherein when the remote device comes back within the communication range, the remote device re-communicates with the user device by the link back mode to recover the communication with the user device.

9. The method of claim 6, wherein when the remote device enters the access state, the remote device further re-communicates with the user device by a shutdown mode in a third time interval.

10. The method of claim 9, wherein the shutdown mode means that a communication function of the remote device is closed.

* * * * *